United States Patent [19]
Vogelesang et al.

[11] Patent Number: 5,039,571
[45] Date of Patent: Aug. 13, 1991

[54] METAL-RESIN LAMINATE REINFORCED WITH S2-GLASS FIBRES

[75] Inventors: Laurens B. Vogelesang, Nieuwkoop; Gerardus H. J. J. Roebroeks, Den Bommel, both of Netherlands

[73] Assignee: Akzo nv, Arnhem, Netherlands

[21] Appl. No.: 255,435

[22] Filed: Oct. 11, 1988

[30] Foreign Application Priority Data

Oct. 14, 1987 [NL] Netherlands ............... 8702453

[51] Int. Cl.$^5$ ............................. B32B 15/08
[52] U.S. Cl. ............................. 428/213; 428/246; 428/457; 428/458
[58] Field of Search ............... 428/901, 213, 457, 246

[56] References Cited

U.S. PATENT DOCUMENTS 4,110,147 8/1978 Grunwald et al. ............. 428/901 X

FOREIGN PATENT DOCUMENTS 8100087 1/1981 Netherlands.
8100088 1/1981 Netherlands.

OTHER PUBLICATIONS

English translation of Netherlands 8100087, 13 pages.
English translation of Netherlands 8100088, 16 pages.
English translation of Enka, "An Aramid Yarn for Reinforcing Plastics", May 25–26, 1977, Plastica 30, pp. 374–380.

*Primary Examiner*—Thomas J. Herbert
*Attorney, Agent, or Firm*—Stevens, Davis, Miller & Mosher

[57] ABSTRACT

Laminate displaying improved blunt notch behavior, so that it is suitable for use as a construction material in aviation and cosmonautics. It comprises an intermediate layer of synthetic material reinforced by continuous glass filaments having a modulus of elasticity of at least 80 GPa. The glass filaments contain at least 58–69% by weight of $SiO_2$, 18–29% by weight of $Al_2O_3$, and MgO. Preferably, they have a tenacity of at least 4 GPa, and an elongation at break of at least 4%. The synthetic material may be an amorphous thermoplastic resin having a Tg > 140° C. such as, e.g., polyarylates, poly(ether)-sulfones, polyetherimides or poly-p-phenylene ethers, or a semi- or para-crystalline resin having a crystalline melting point > 170° C., such as poly-phenylene sulfides, polyetherketones or liquid crystal polymers.

13 Claims, 7 Drawing Sheets

Blunt notch behaviour of several materials.

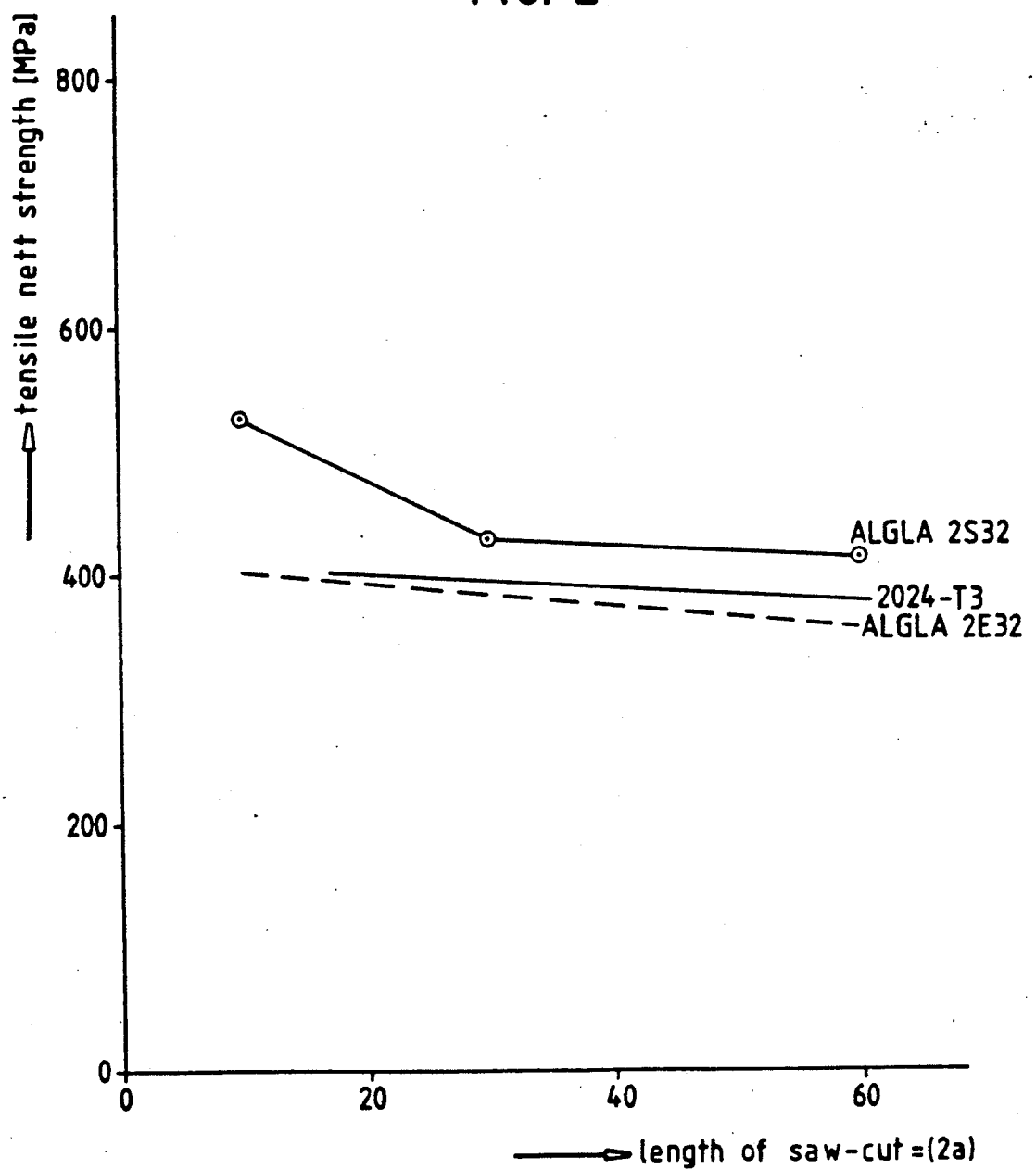
Residual strength of several materials.

Comparison of fatique crack propagation rate in several materials.

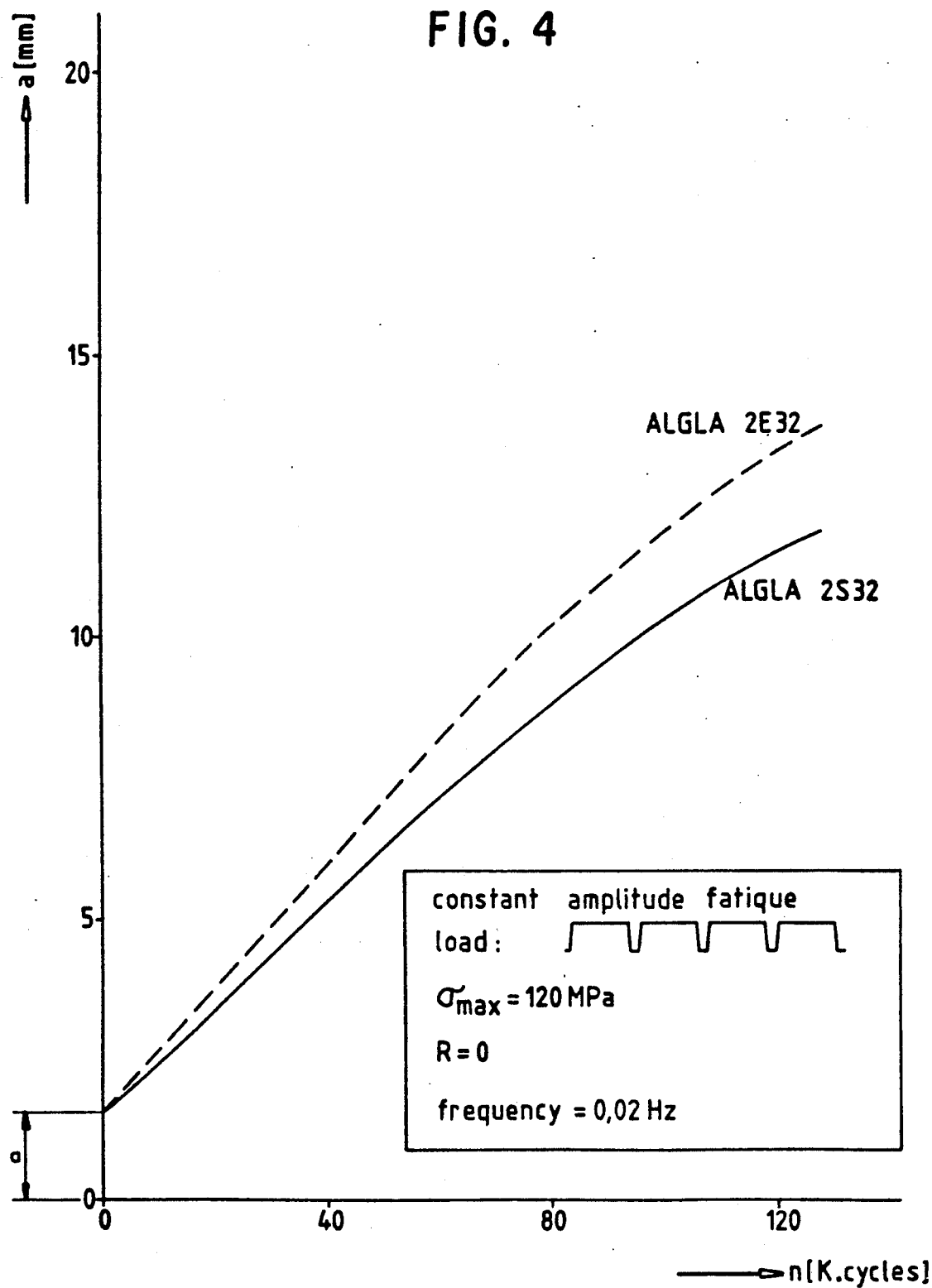
Comparison of fatigue crack propagation rate in several laminates.

METAL-RESIN LAMINATE REINFORCED WITH S2-GLASS FIBRES

The invention relates to a laminate composed of at least two metal sheets, between which there is provided a synthetic layer bonded to the metal sheets, which layer contains continuous glass filaments having a modulus of elasticity greater than 50 GPa.

Such a laminate is known from Dutch Patent Application Nos. 8 100 087 and 8 100 088. The article by Kh. Hillermeier and H. G. Weijland referred to on page 2 and page 3, respectively, of said Patent Specifications, "An aramid yarn for reinforcing plastics", Plastica, November 1977, No. 11, pp. 374-380, describes for reinforcement filaments of glass the so-called E-glass, which under tensile load displays a modulus of elasticity of 70 GPa and a tensile strength of 1,9 GPa (see Table I on p. 375 of the aforesaid Plastica article). Said E-glass as a rule substantially consists of 55% by weight of $SiO_2$, 15% by weight of $Al_2O_3$, 19% by weight of CaO, 7% by weight of $B_2O_3$, and 3% by weight of MgO, and optionally of small amounts of other materials. In actual practice reinforcement filaments and fibres of E-glass have for dozens of years been applied successfully on a very wide scale for reinforcing synthetic materials. Although reasonable results may in principle be obtained using the known laminate composed of an E-glass filaments-reinforced synthetic layer mentioned in the opening paragraph, the performance of these known laminates is not optimal when subjected to particular frequently occurring load situations. The known laminate in particular is not always fully capable of meeting the high demands on the blunt notch behaviour of a construction panel in air- and spacecraft engineering. Tests have even shown that under tensile load the blunt notch behaviour of simple and inexpensive solid sheets of an aluminium alloy will be more favourable under particular conditions than that of sheets composed of the more expensive and more intricate known laminate consisting of sheets of an aluminium alloy and an E-glass filaments-reinforced synthetic layer. The invention has for its object to provide a laminate of the type mentioned in the opening paragraph, in which the aforesaid drawbacks have been overcome. The laminate according to the invention is characterized in that the glass filaments have a modulus of elasticity of at least 80 GPa, more particularly 80-100 GPa, and are essentially composed as follows:

| component | percentage by weight |
|---|---|
| $SiO_2$ | 58-69, preferably 60-65 |
| $Al_2O_3$ | 18-29, preferably 20-25 |
| MgO | 7-19, preferably 9-15 |

The laminate according to the invention is with advantage characterized in that the tensile strength of the glass filaments is at least 4 GPa, more particularly 4-6 GPa, and their elongation at rupture at least 4%, more particularly 5-6%, the density of the glass filaments is 2,4-2,5 g/cm$^3$, the diameter of each of the glass filaments 5-25 $\mu$m, more particularly 8-12 $\mu$m, the metal sheets consist of a material having a tensile strength higher than higher than 0,20 GPa, preferably 0,35 GPa, the metal sheets each have a thickness of less than 1,5 mm, more particularly a thickness of 0,1-0,8 mm, the number of metal sheets is in the range of 2 to 20, a large number of continuous glass filaments extend parallel to each other in at least one direction, the glass filaments are covered with a substance for bonding them to the synthetic material, and the glass filaments constitute 35-75 per cent by volume, more particularly 40-65% by volume of the total volume of synthetic material and glass filaments combined. According to the invention the metal sheets in the laminate may be of a metal selected from the following group of materials: steel, aluminium alloy, more particularly aluminium-copper alloys, such as those of the AA(USA) No. 2024 type or aluminium-zinc alloys, such as those of the AA(USA) No. 7075 type, titanium alloys, and copper. A preferable embodiment of the laminate according to the invention is characterized in that the synthetic layer is composed of one or more layers of plasticsimpregnated glass filaments, the filament layers being provided on either side with a synthetic boundary layer contacted by the metal sheets and bonded thereto, which boundary layers contain virtually no glass filaments. Favourable results have been attained using a laminate characterized according to the invention in that the synthetic layer consists of a non-thermoplastic synthetic material, such as epoxy resin, unsaturated polyester resin, vinyl esters, or phenol resins.

For uses requiring a relatively high deformability of the laminate according to the invention, the synthetic layer should according to the invention be of a thermoplastic synthetic material. In the first place, use may to this end be made according to the invention of a virtually amorphous thermoplastic synthetic material having a glass transition temperature $T_g$ of at least 80° C., more particularly above 130° or 140° C., preferably above 160° C., such as polyarylate (PAR), polysulphone (PSO), polyethersulphone (PES), polyetherimide (PEI), or polyphenylene ether (PPE), more particularly poly-2,6 dimethyl phenylene ether. In addition, use may be made according to the invention of a semi-crystalline or para-crystalline thermoplastic synthetic material having a crystalline melting point Tm of at least 130° C., more particularly above 170° C., and preferably above 270° C., such as polyphenylene sulphide (PPS) polyamide-4,6, polyketone sulphide, polyether ketones, more particularly polyether-ether ketone (PEEK), polyether ketone (PEK), and polyether ketone-ketone (PEKK), or liquid crystal polymers, such as XYDAR of Dartco composed of the monomers bisphenol, terephthalic acid, and hydroxybenzoic acid. Alternatively, according to the invention use may with advantage be made of a synthetic material in the form of a thermoplastic material having a glass transition temperature Tg higher than 130° C.

It has been found that under tensile load the blunt notch behaviour of the laminate according to the invention is more favourable than that of the aforementioned known laminate with E-glass filaments, and that the laminate according to the invention will even display a more favourable blunt notch behaviour than a solid sheet of an aluminium alloy. This is surprising since it is well-known that solid sheets of aluminium alloys display a particularly favourable blunt notch behaviour. By the blunt notch behaviour of a constructional component is meant the influence of a structural distortion in the material on the tensile strength. As distortions in the material in the form of bolt holes, passages for cables or lines will occur frequently, the favourable blunt notch behaviour of the laminate according to the invention should be considered a significant advantage in actual practice.

The glass filaments applied in the laminate according to the invention have a greater rigidity than the E-glass filaments used in the known laminates, as a result of which fatigue cracks in the laminate according to the invention will less readily propagate. Consequently, the laminates according to the invention display a lower crack propagation rate than the known laminates based on E-glass filaments.

Because of the relatively high elongation at rupture, viz. 5–6%, of the glass filaments used in the laminate according to the invention, the deformation treatments frequently applied in the further processing of the laminate, in which the filaments are subjected to a longitudinal load, will cause fewer problems. Also, said high elongation at rupture will result in a higher energy absorption up to the moment at which the glass filaments will break and, hence, in more favourable impact properties of the laminate according to the invention.

Particularly when in the laminate according to the invention the synthetic layer consists of a thermoplastic synthetic material, the several constituent layers of the laminate will have to be compressed during manufacture at a relatively high processing temperature, e.g. about 200° to 400° C., depending on the type of synthetic material used. This high processing temperature will lead to the presence in the laminate of quite high residual stresses after it has been cooled to room temperature owing to the different coefficients of expansion of the metal sheets and the glass filaments. According to the invention, such unfavourable residual stresses, with tensile stresses prevailing in the metal sheets and compressive stresses in the glass filaments, may be eliminated in a simple manner by subjecting the laminate in its entirety to a pre-stressing treatment. In such pre-stressing the laminate in its entirety is so elongated that the metal sheets are subject to plastic deformation without causing the glass filaments to break. After the laminate has been prestressed to a sufficient degree, compressive stresses will prevail in the metal sheets of the externally entirely unloaded laminate and tensile stresses in the glass filaments. Partly as a result of the high elongation at rupture of 5–6% of the glass filaments in the laminate according to the invention, the laminate may be sufficiently pre-stressed in a simple manner. Consequently, even when use is made of a synthetic layer of a thermoplastic synthetic material having a very high processing temperature of about 400° C., an optimally applicable end laminate may be obtained after said pre-stressing. It is further expected that the compressive properties of the laminate according to the invention are more favourable than those of the known laminate with reinforcement filaments of E-glass.

It should be added that in the article entitled "Glass Composition for Spinning Fibre" by S. Kumar in Journal of Non-Crystalline Solids 80 (1986) Mar. No. 1/3, pp 122–134, Amsterdam, Netherlands, mention is made of polymer composites reinforced with glass fibres. This article describes the uses of various types of glass fibres, such as the E-glass, C-glass, S-glass and AR-glass and N-glass fibres. Reference is also made to FR-A-1 357 393, which describes the composition of S-glass per se. Mention is further made of EP- 0 013 146A, which relates to a laminate comprising a relatively thick thermoplastic layer of synthetic material covered on both sides with a metal layer. In said patent application it is stated in general that the layer of synthetic material may optionally contain glass fibres.

BRIEF DESCRIPTION OF THE DRAWINGS

To illustrate the advantages of the laminate according to the invention a comparison was made in FIG. 1 (with which should be considered FIGS. 1A, 1B, 1C, 1D, 1E and 1F) between the blunt notch behaviour of test specimens of the laminate according to the invention and the blunt notch behaviour of several other materials. To that end the nett tensile strength in MPa is plotted on the ordinate and the magnitude of the stress concentration factor $K_t$ on the abscissa. The curve of the blunt notch behaviour of test specimens of the laminate according to the invention is depicted by the line indicated with ALGLA-2S42. Said laminate is composed of two sheets of aluminium-copper alloy of the AA(USA) No. 2024-T$_3$ type with a thickness each of 0,4 mm. The glass filaments were of the type marketed by Owens Corning Fiberglas under the trademark S$_2$ ®-glass. The modulus of elasticity of the S$_2$ ®-glass filaments used was about 88,5 GPa, the tensile strength about 4,7 GPa, the elongation at rupture about 5,4%, the density 2,5 g/cm$^3$, and the linear coefficient of expansion about $2,5.10^{-6}$ mm/mm/° C. The S$_2$ ®-glass filaments used each had a diameter of about 10 μm and were introduced into a thermosetting synthetic matrix based on epoxy resin of the AF163-2 type marketed by Minnesota Mining and Manufacturing Company. The glass filaments formed 50% by volume of the total volume of synthetic material and glass filaments. The prepreg formed by the glass filaments-reinforced synthetic layer had a total thickness of about 0,3 mm and during the manufacture of the laminate it was placed in between the two aluminium sheets and intimately attached to them. The laminate according to the invention was not pre-stressed. The ALGLA-2S42 curve in FIG. 1 was plotted by subjecting the test specimens drawn in FIG. 1 to tensile tests. The peak of the ALGLA-2S42 line was determined from the average of repeated measurements on the drawn, nonperforated test specimen, so that $K_t = 1,0$. The next, lower point was determined from the average of repeated measurements on the drawn test specimen, which was provided with a circular perforation (distortion of the material) 10 mm in diameter, such that $K_t = 2,08$. The lowest point of the ALGLA-2S42 line in FIG. 1 was determined from the average of repeated measurements on the drawn test specimen, which had been provided with an elongated perforation (distortion of the material), such that $K_t = 3,18$. The curve of the blunt notch behaviour of a prior art laminate is illustrated in FIG. 1 by the dash ALGLA-2E42 line. The only difference between such a laminate and the laminate according to the invention is that the reinforcement filaments are of E-glass instead of S$_2$ ®-glass. Use was made of E-glass having a modulus of elasticity of about 74 GPa, a tensile strength of about 3,5 GPa, an elongation at rupture of about 4,8%, a density of about 2,6 g/cm$^3$, and a linear coefficient of expansion of about 5,1×10$^{-6}$ mm/mm/° C. In addition, there is depicted in FIG. 1 the blunt notch behaviour of two solid sheets of two different aluminium alloys, viz. aluminium-zinc alloy of the AA(USA) No. 7075-T$_6$ type and aluminiumcopper alloy of the AA(USA) No. 2024-T$_3$ type. As shown in FIG. 1, the blunt notch behaviour of the ALGLA-2S42 laminate according to the invention is considerably more favourable than that of the comparable prior art ALGLA-2E42 laminate. The blunt notch behaviour of the ALGLA-2S42 laminate according to the invention also is more favourable than that of solid sheets of the 7075-T$_6$ and 2024-T$_3$ aluminium alloys. Furthermore, FIG. 1 shows that for a stress concentration factor above about 2,2 the blunt notch behaviour of the prior art laminate ALGLA-2E42 is even more unfavourable than that of a simple solid sheet of 7075-T$_6$ aluminium alloy. It should be noted that the stress concentration factor K$_t$ is calculated in a manner conventional in the art using the formula $$K_t = \frac{\sigma_{peak}}{\sigma_{nominal}}, \text{ wherein}$$

σpeak=the peak stress in the sheet material at the end of the distortion, which may for instance be in the form of a circular hole or a slot.

σnominal=the tensile stress at the distortion calculated from the tensile strength divided by the remaining (nominal) surface area of the cross-section of the test bar at the distortion.

Figure 1:
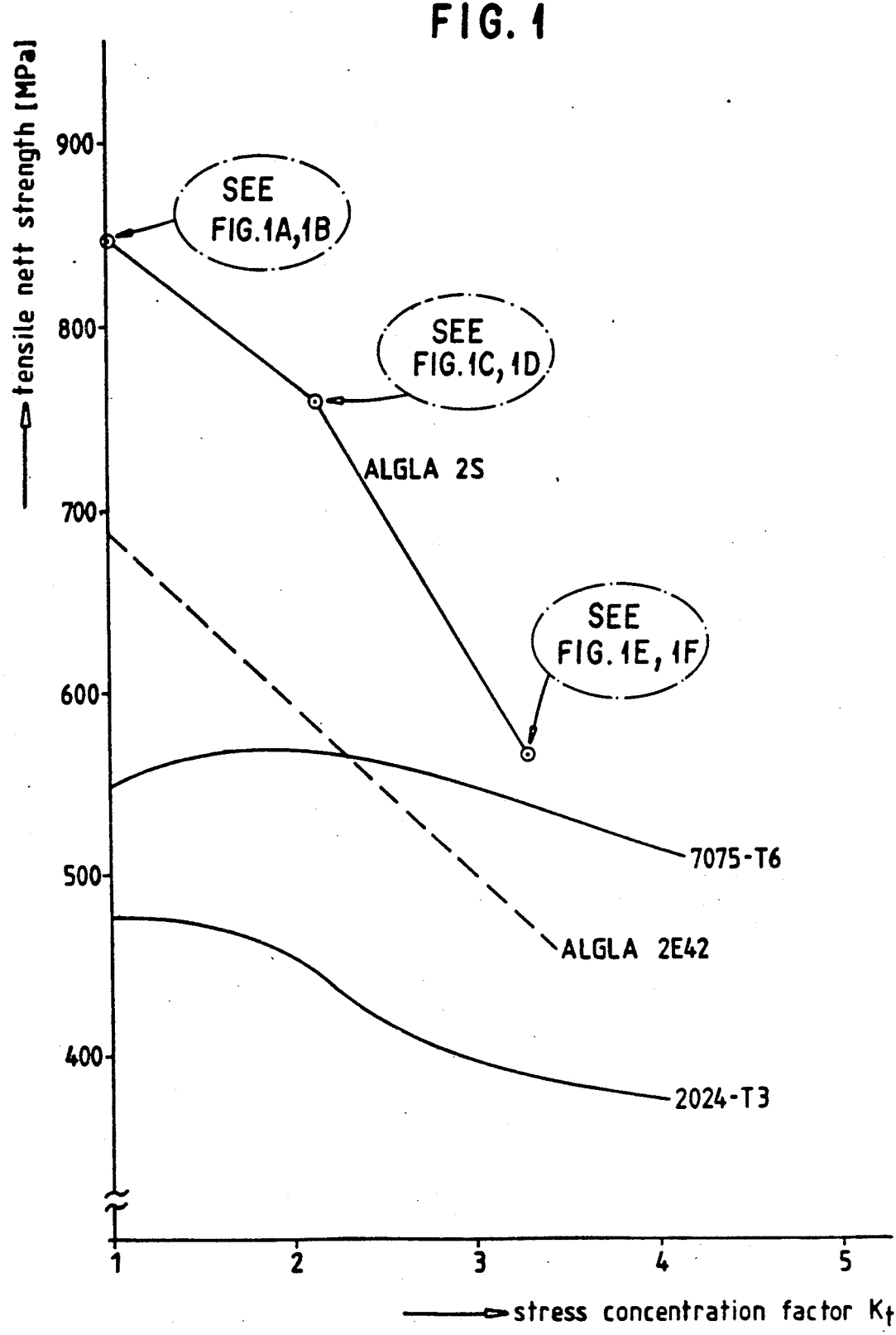
FIG. 1 illustrates comparison between the blunt notch behavior of the laminate of the invention and that of several other materials.
Figure 1F:
Figure 1E:
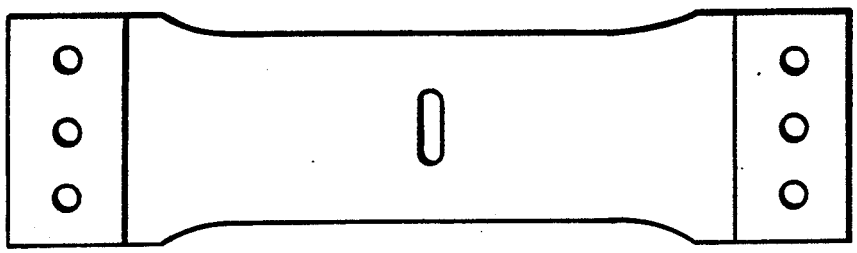
Figure 1D:
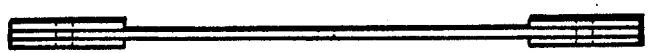
Figure 1C:
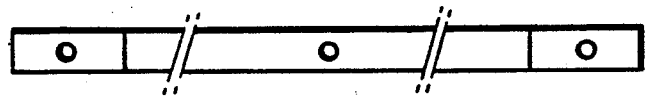
Figure 1B:
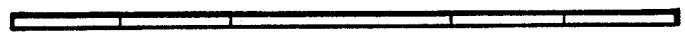
Figure 1A:
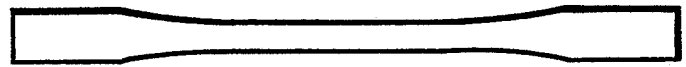
Figure 2A:
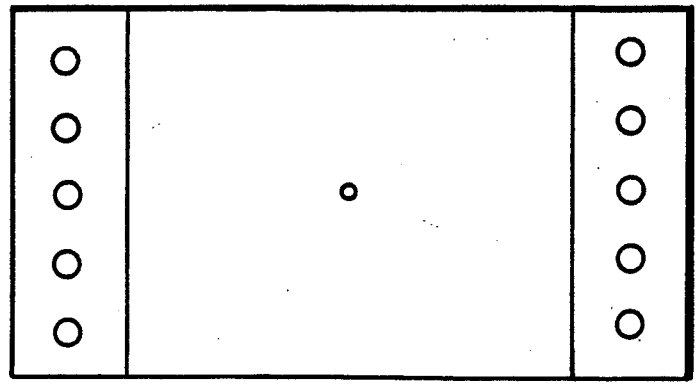
FIG. 2 shows the influence on the tensile strength of a saw-cut crack in the sheet material.

FIG. 2 (with which consider FIG. 2A) gives test results showing the influence on the tensile strength of a (sharp) saw-cut crack in the sheet material. In FIG. 2 to this end the nett tensile strength in MPa is plotted on the ordinate and the length of the previously made crack or saw-cut transverse to the direction of drawing is plotted on the abscissa. The shape of the test specimens of sheet material used is drawn in FIG. 2A. The variation in the residual tensile strength or residual strength for test specimens of the laminate according to the invention is illustrated by the line indicated with ALGLA-2S32. The only difference between this laminate and the ALGLA-2S42 laminate described with reference to FIG. 1 consists in that the aluminium sheets in the ALGLA-2S32 laminate each have a thickness of 0,3 mm. The ALGLA-2S32 curve was plotted by constantly repeated tests on the drawn test specimens in which (sharp) saw-cut cracks of a total length 2a of 10 mm, 30 mm, or 60 mm had been made. The curve of the residual strength for test specimens of the prior art laminate is given by the dash line indicated with ALGLA-2E32. The only difference between said laminate and the ALGLA-2E42 laminate described with reference to FIG. 1 consists in that the aluminium sheets in the ALGLA-2E32 laminate each have a thickness of 0,3 mm. In addition, FIG. 2 shows the curve of the residual strength for test specimens of solid sheet material indicated with the line 2024-T$_3$ for the aluminium-copper alloy of the same designation. As shown in FIG. 2, the ALGLA-2S32 laminate according to the invention displays a more favourable residual strength behaviour in the case of relatively sharp cracks than does the comparable prior art ALGLA-2E32 laminate. FIG. 2 also demonstrates that said residual strength behaviour of the laminate according to the invention is more favourable than that of solid sheet material of copper-aluminium alloy of the AA(USA) 2024-T$_3$ type. As shown in FIG. 2, the residual strength behaviour of the ALGLA-2S32 laminate according to the invention in particular is relatively favourable in the event of comparatively short saw-cut cracks having a length of the order 2a=10 mm.

Figure 3:
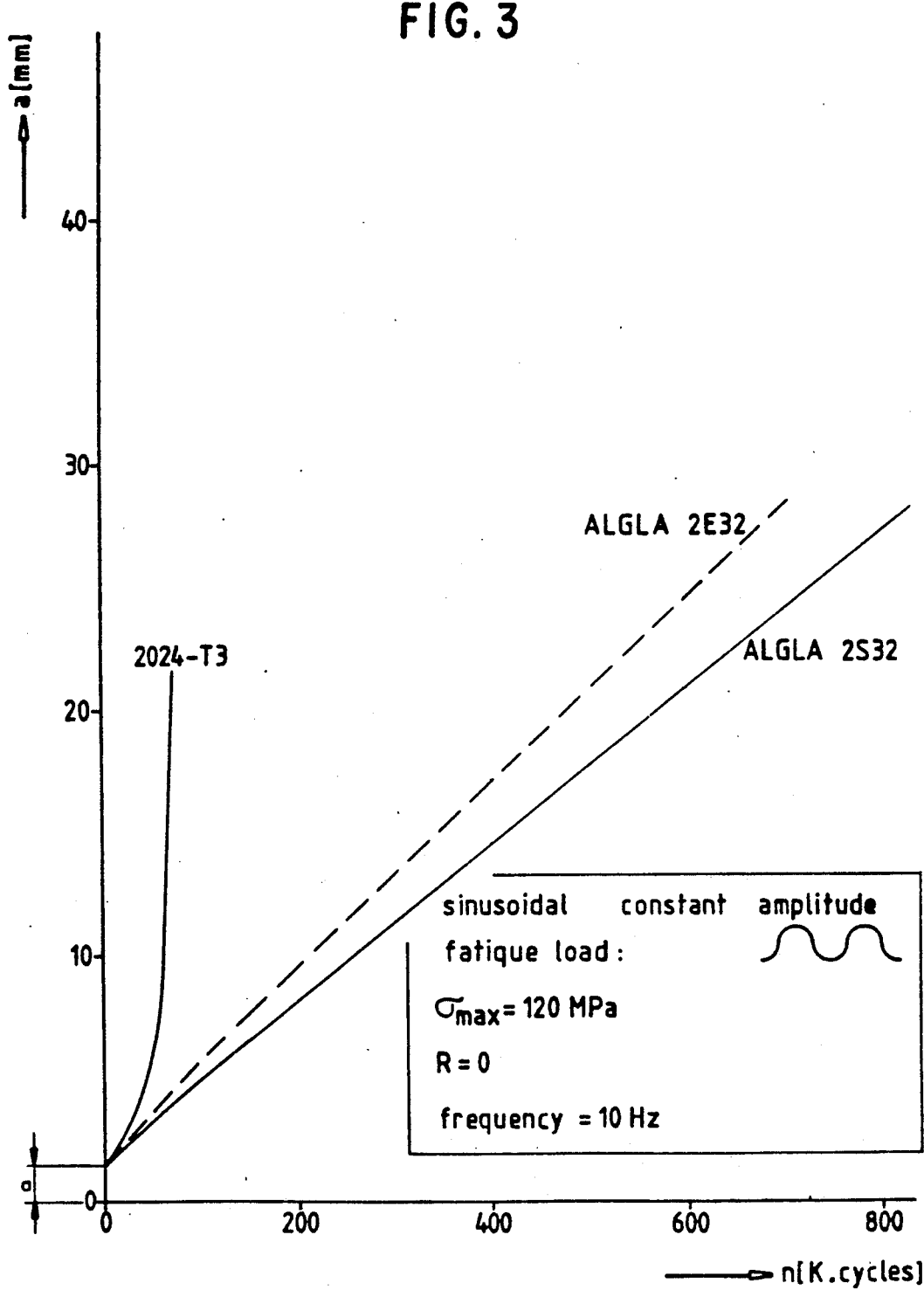
FIG. 3 depicts the faligue performance of specimens of the laminate according to the invention over that of the prior art laminate. As in FIG. 3.
Figure 3A:
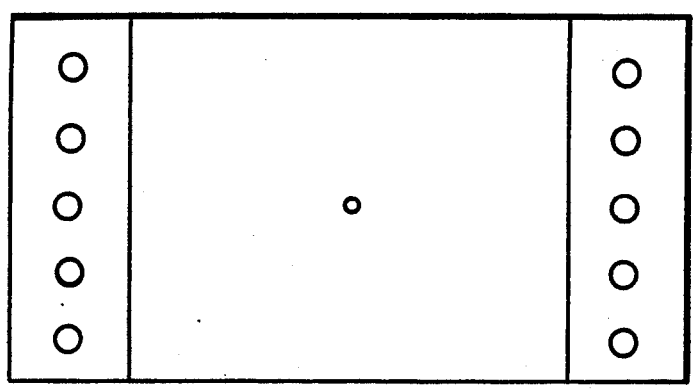

In FIG. 3 (with which consider FIG. 3A) the fatigue performance of test specimens of the laminate according to the invention of the ALGLA-2S32 type described earlier is depicted in comparison with that of the earlier described prior art ALGLA-2E32 laminate. The fatigue performance of test specimens of solid sheet material of 2024-T$_3$ aluminium-copper alloy is also given in FIG. 3. The shape of the test specimens used is drawn in FIG. 3 and shows that use was made of test specimens in which a (sharp) saw-cut crack of a total length 2a=3mm had been made. In FIG. 3A the half lengths of the crack are plotted on the ordinate. On the abscissa is plotted the total number of cycles of the used sinusoidally varying tensile fatigue load at constant amplitude. The frequency of the varying load was 10 Hertz. The load varied from a maximum tensile stress σ$_{max}$=120 MPa to a minimum tensile stress σ$_{min}$=0. Accordingly, the fatigue load used is of the type $$R = \frac{\sigma_{min}}{\sigma_{max}} = 0$$

As demonstrated in FIG. 3, the ALGLA-2S32 laminate according to the invention displays a lower crack propagation rate under the influence of said varying load than does the ALGLA-2E32 prior art laminate. It may therefore be concluded that the fatigue performance of the laminate according to the invention is more favourable than that of the prior art laminate. Both laminates display a far more favourable fatigue performance than does the laminate of solid sheet material of aluminium-copper alloy of the 2024-T$_3$ type.

Figure 4A:
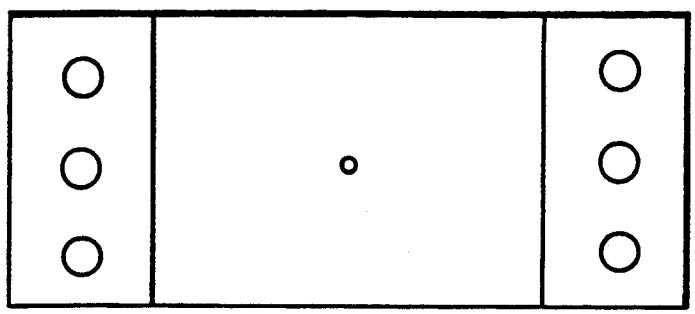
FIG. 4 illustrates the fatigue performance of test specimens of the laminate of the invention in comparison with the earlier AlG1A-2E32 prior art laminate.

As in FIG. 3, FIG. 4 (with which consider FIG. 4A) illustrates the fatigue performance of test specimens of the laminate according to the invention of the earlier-described ALGLA-2S32 type in comparison with the earlier described ALGLA-2E32 prior art laminate, use being made, however, of a somewhat different type of load. The shape of the test specimens used is drawn in FIG. 4A and shows that use is made of test specimens in which a (sharp) saw-cut crack of a total length 2a=3mm has been made.

In FIG. 4 again the half crack lengths are plotted on the ordinate. On the abscissa is plotted again the total number of cycles of the used varying tensile fatigue load at constant amplitude. In this case the variation in load is not sinusoidal but more or less block shaped, as is shown schematically in FIG. 4. The frequency of this varying load is only 0.02 Hertz. The load varied from a maximum tensile stress σ$_{max}$=120 MPa to a minimum tensile stress σ$_{min}$=0. The fatigue load used is therefore also of the type $$R = \frac{\sigma_{min}}{\sigma_{max}} = 0.$$

As is also demonstrated in FIG. 4, the ALGLA-2S32 laminate according to the invention displays less crack propagation under the influence of this type of varying load than does the ALGLA-2E32 prior art laminate. Consequently, the fatigue performance of the laminate according to the invention for this type of load is more favourable than that of the prior art laminate.

Figure 5:
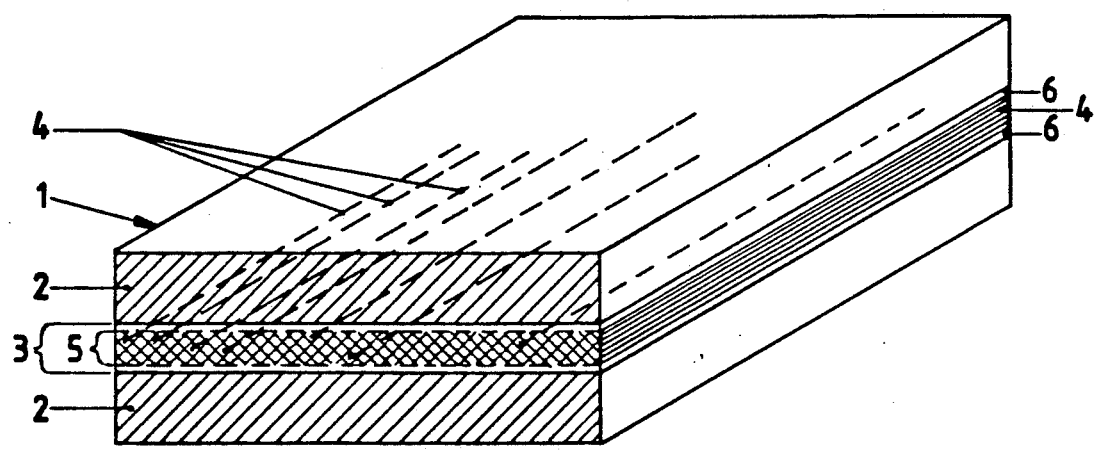
FIGS. 5 and 6 show two laminates according to the invention.

The fatigue load discussed with reference to FIGS. 3 and 4 which has a low frequency and $$R = \frac{\sigma_{min}}{\sigma_{max}} = 0$$

occurs particularly in the fuselage of an aircraft, since throughout the flight the interior of an aircraft is subject to a pressure in excess of the outside pressure, the shell plating being subject to a tensile load. After the flight the load on the fuselage drops back to zero. The frequency of the fatigue load on an aircraft fuselage is very low, viz. lower than 0,001 Hertz. Sheets of the laminate according to the invention are for that reason considered extremely suitable to be used as skin sheet or shell plating in the skin of an aircraft pressure cabin. FIG. 5 is a schematic drawing in perspective of an embodiment of the laminate according to the invention generally referred to by the numeral 1. The laminate 1 consists of two metal sheets 2 with in between them a prepreg 3 composed of a synthetic layer reinforced with a very large number of parallel or unidirectional threads or filaments 4 of glass. The synthetic layer 3 may be made up of a core layer of plastics-impregnated filaments 5 and on either side of it a boundary layer 6 intimately attached to the metal sheets 2, the boundary layers containing virtually no filaments.

Figure 6:
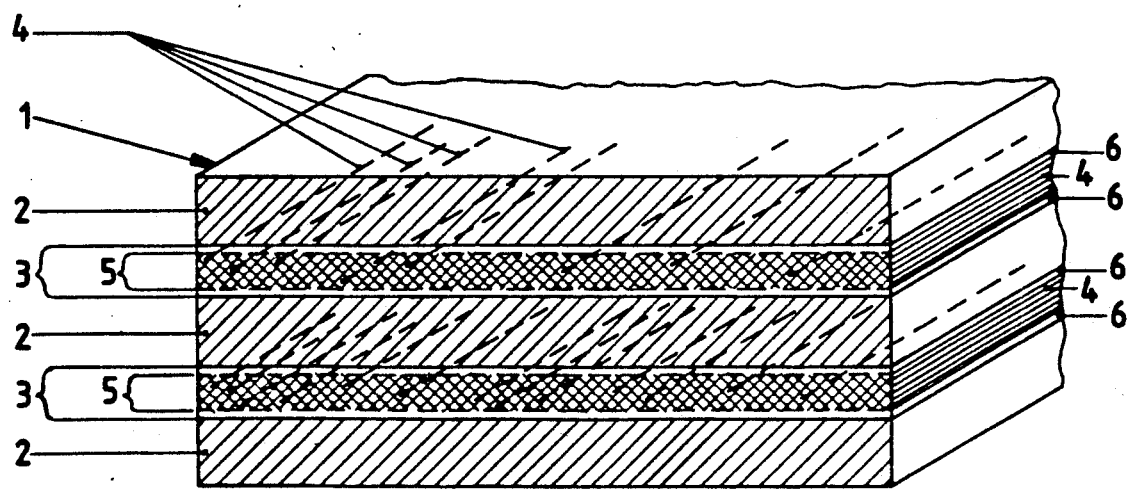

FIG. 6 is a cross-sectional view of a laminate 1 according to the invention, which differs from the laminate according to FIG. 5 only in that it is composed of three metal sheets 2 with in between them two synthetic layers 3 reinforced with parallel glass filaments 4.

The manufacture of the laminate according to the invention shown in FIG. 5 first of all comprised the superimposition, on a movable support, of two identical metal sheets of an appropriate aluminium alloy with interposition of said prepreg, which may for instance be composed of a large number of parallel (unidirectional) continuous glass filaments impregnated with a thermosetting synthetic material based on epoxy resin. While on the support, the resulting laminate of loose parallel parts, viz. two metal sheets with in between them the prepreg, was covered with a film. Next, the laminate wrapped in film and still consisting of loose parts was compressed externally by creating a vacuum inside the wrapping of the laminate. The wrapped laminate along with its moveable support was then placed in an autoclave. After the autoclave had been closed, the laminate in it was subjected to an air pressure of 4 bar and the temperature was increased to 120° C. After a 66 minutes stay in the autoclave the laminate was finished and it was removed from the autoclave. Optionally, the cooled laminate may also be pre-stressed in the manner described earlier, such that in the metal sheets of the laminate in its externally entirely unloaded state there prevails a compressive stress and in the filaments a tensile stress.

Before being attached to the prepreg, the metal sheets should of course be subjected to various appropriate pre-treatments, such as alkaline degreasing, etching in a chromic-sulphuric acid bath, anodizing in chromic acid or phosphoric acid, application of a primer appropriate to the type of synthetic material used, e.g. on a basis of epoxy phenol and having corrosion inhibiting properties, or the like.

The term tensile strength of the glass filaments used in the description invariably refers to the virgin tenacity at tensile load in the longitudinal direction of the filament and measured on a single filament containing no adhesives, i.e. a virgin filament, the measurements being carried out in accordance with ASTM NO. D3379-75. The modulus of elasticity also has to be determined in accordance with ASTM No. D3379-75.

The aforementioned glass transition point $T_g$ of said substantially amorphous thermoplastic synthetic materials should be determined employing a dynamic mechanical measuring device of the RDA-700 type of the make Rheometrics, using a frequency of 1 Hertz and a heating rate of 2° C./min. at most. $T_g$ is the temperature at which there is a maximum damping modulus $G''$.

The aforementioned crystalline melting point $T_m$ of the semi-crystalline thermoplastic synthetic materials is determined by Differential Scanning Calorimetry (DSC). This determination is carried out with the DSC-7 type measuring apparatus of Perkin Elmer at a heating rate of 20° C./min. $T_m$ is defined here as the peak maximum of the endo-thermical peak in the DSC curve.

Within the scope of the invention various changes may be made. Although in the laminates according to the invention it is preferred that use be made of metal sheets having the same thickness, it is in principle also possible for one and the same laminate to contain metal sheets which have two or more thicknesses and are arranged symmetrical or not. As a rule, the thickness of the synthetic layer between two successive metal sheets will be of approximately the same order of magnitude as that of each of the metal sheets.

Optionally, the synthetic layer may contain some conventional additions such as fillers. The continuous reinforcing threads or filaments in the synthetic layers may extend parallel to each other in one direction, i.e., they may be arranged unidirectional. Alternatively, there may be applied two groups of reinforcing filaments. Each group will then comprise a very large number of parallel filaments, the threads or filaments of the one group extending at right angles to the filaments of the other group. Such an arrangement may for instance be realized by providing the filaments of the two groups in the form of a fabric.

We claim:

1. A laminate composed of at least two metal sheets having a synthetic layer bonded therebetween, said layer containing continuous glass filaments wherein:
  A) the glass filaments have a modulus of elasticity of 80-100 GPa;
  B) the metal sheets each have a thickness of less than 1.5 mm and contain a material having a tensile strength greater than 0.20 GPa;
  C) the metal sheets are of a metal selected from the group consisting of: aluminum alloys; steel; titanium alloys; copper; copper alloys and magnesium alloys; and
  D) the glass filaments extend parallel to each other in at least one direction; constitute 35-75% by volume of the synthetic layer; and are comprised of 58-69% by weight of $SiO_2$ and 18-29% by weight of $Al_2O_3$.

2. A laminate according to claim 1, wherein the thickness of the synthetic layer between two successive metal sheets is of the same order of magnitude as that of each of the metal sheets.

3. A laminate according to claim 1, wherein the tensile strength of the glass filaments is 4–6 GPa.

4. A laminate according to claim 1, wherein the elongation at rupture of the glass filaments if 4–6%.

5. A laminate according to claim 1, wherein the number of metal sheets is in the range of 2–20.

6. A laminate according to claim 1, wherein the thickness of the synthetic layer between two successive metal sheets is less than that of each of the metal sheets.

7. A laminate according to claim 1, wherein the synthetic layer further comprises a thermosetting adhesive material.

8. A laminate according to claim 1, wherein the synthetic layer further comprises a thermoplastic synthetic material.

9. A laminate according to claim 1, wherein the metal sheets each have a thickness of 0.1–0.8 mm.

10. An aircraft fuselage, wherein the skin sheet is composed of the laminate according to claim 1.

11. A laminate according to claim 1, wherein the glass filaments are further comprised of 7 to 19% by weight of a network-modifying oxide.

12. A laminate according to claim 11, wherein the network-modifying oxide is MgO.

13. A laminate according to claim 12, wherein the amount of MgO is 9–15% by weight.

* * * * *